Oct. 28, 1969 C. R. CAHN 3,475,558

TIME GATED PSEUDONOISE MULTIPLEXING SYSTEM

Filed Sept. 1, 1964 4 Sheets-Sheet 1

INVENTOR:
Charles R. Cahn
By Smyth, Roston & Pavitt
Attorneys $$\phi(\tau)=\frac{1}{T}\int_0^T E_c(t)E_c(t+\tau)\,dt$$

INVENTOR
Charles R. Cahn
By Smyth, Roston & Pavitt
Attorneys

INVENTOR
Charles R. Cahn

By Smyth, Roston & Pavitt
Attorney.

TIME GATED PSEUDONOISE MULTIPLEXING SYSTEM

Filed Sept. 1, 1964 4 Sheets-Sheet 4

Fig. 8 (Pseudo-Random Binary Sequence $E_c(t)$ Code I

INVENTOR
Charles R. Cahn
By Smyth, Roston & Pavitt
Attorney.

United States Patent Office
3,475,558
Patented Oct. 28, 1969

3,475,558
TIME GATED PSEUDONOISE MULTIPLEXING SYSTEM

Charles R. Cahn, Manhattan Beach, Calif., assignor to The Magnavox Company, Torrance, Calif., a corporation of Delaware
Filed Sept. 1, 1964, Ser. No. 393,700
Int. Cl. H04j 3/02
U.S. Cl. 179—15 19 Claims

ABSTRACT OF THE DISCLOSURE

A transmission system is disclosed involving multiple transmitter stations and multiple receiver stations, each of the latter is capable of receiving information from one, some, or all of the former. The information to be transmitted to a particular receiver is carrier-modulated and modulated with a pseudo random code to obtain a spread spectrum signal. That signal is time gated for transmission, the time gate being controlled from a second pseudo random code generator. The transmission to a particular station is preceded by transmission of a third pseudo random code, serving as an addressing of a particular receiver. The receiver, when receiving the third random code, starts its own particular pseudo random code generators providing replicas of the first and second pseudo random codes; the second one time gates the received signal, the first one is used for demodulation.

The present invention relates to a transmission system and method in which a number of transmitters use a common channel for individual communication with different receivers.

It is an object of the present invention to solve the problem inherent in such a system and resulting from the fact, that each receiver must at times be enabled to receive signals from a distant transmitter, while a more closely positioned transmitter communicates with a second receiver at the same time, which latter communication is in fact a strong noise source for the first mentioned receiver.

According to one aspect of the present invention, in a preferred embodiment thereof, it is suggested to use the following transmission system. Each receiver is equipped with a particular type of generator providing a unique sequence of binary type signals. The occurrence of bits in this binary sequence is to have a distribution so that the autocorrelation function thereof has a characteristic which corresponds or is at least similar to a substantial extent to the autocorrelation of a true random sequence of pulses. The different receivers are equipped with generators producing different sequences of binary pulses so that the cross correlation between any two of such sequences is substantially zero, such as is the cross correlation of two true random pulse trains. Sequences produced at will but having such statistical characteristics will in the following be called pseudo random codes or sequences.

Any transmitter which is to communicate with any one of those receivers, is equipped with means to produce all these different types of pseudo random codes, one at a time. A transmitter communicating with a particular receiver, will therefore, produce the pseudo random code or sequence assigned to this receiver and produced therein when needed for communication. Both receiver and transmitter are time gated in accordance with this particular pseudo random code, a phase difference between the two similar sequences allowing for the wave propagation time as between the transmitter and receiver stations. "Time gating" means, that transmission and reception is interrupted for periods of time occurring as the complement of the two similar pulse sequences.

This invention is of particular advantage, if the carrier band transmitted by any of the transmitters is a spread spectrum. In this case, the carrier band is not restricted to the intelligence band which, by itself occupies only a very narrow band on the carrier. The carrier band is "spread" by including in the carrier modulation a subcarrier type pseudo random signal. For example, the modulated carrier is subjected to a bi-phase modulation by another binary sequence representing a second pseudo random code, or the intelligence modulates this second pseudo random code signal, which then, in turn, biphase modulates the carrier.

The band spreading results in a material processing gain. This processing gain, in turn, can be exploited by increasing the number of time gated transmitters operating simultaneously. In other words, crosstalk between a large number of transmitters is drastically reduced, if each transmitter is time gated and transmits time gated spread spectrum signals, and if two different pseudo random codes respectively govern the spreading of the spectrum and the time gating for each transmitter. A brief analysis on this point will be outlined below. Of course, the receivers will have to be equipped also with two pseudo random code generators, one for time gating the signal received as stated, the other one for correlating this time gated and received signal with the second pseudo random code as produced in this receiver.

All the pseudo random codes employed are preferably produced in the receivers as well as in the transmitters by selective suppression of binary bit signals to be drawn from trains of constant frequency clock pulses. Preferably, but not necessarily, the same pulse train frequency is used for producing the different pseudo random codes throughout the entire transmission system.

Since usually a receiver is equipped with a limiter, a weak signal will be suppressed as long as a stronger signal from a closer positioned transmitter interferes. However, the pseudo random gating of both desired and interfering transmitters, yields periods of time in which the receiver receives only the intended though weak signal and not the interfering though strong signal, the latter then being temporarily blocked off. In case of most unfavorable geometry (largest distance between transmitter and receiver, all other possible interfering transmitters being closer), there still is a finite probability that the weak signal will be received during instances of time in which no other receiver is on, though operating in parallel and concurrently and producing stronger interfering signals whenever turned on.

Studies have shown, that a given number of simultaneously operating transmitters, time gated by the above mentioned pseudo random code generators, will interfere with each other only to such extent that the signal-to-noise ratio resulting from a single transmission per se is not exceeded. In other words, if the receiver, particularly the data modulator therein operates with a given signal-to-noise ratio at threshold, a maximum number of transmitters can be determined, which will produce an interference whereby the combined signal-to-interference of all such transmitters will not exceed this given and permissible signal-to-noise ratio. This favorable result is attributable to the pseudo random time gating in accordance with the invention. The particular type of time sharing of the same carrier band lends itself to the designation of this system as a multiplexing system with random access.

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawing, in which:

Figure 7:
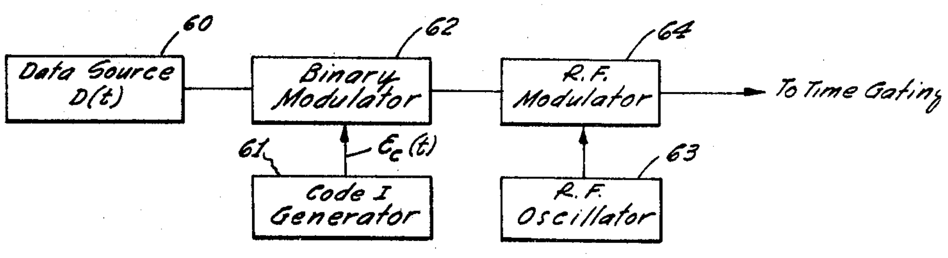
FIGURE 7 illustrates the modification of the network shown in FIGURE 2.
Figure 7:
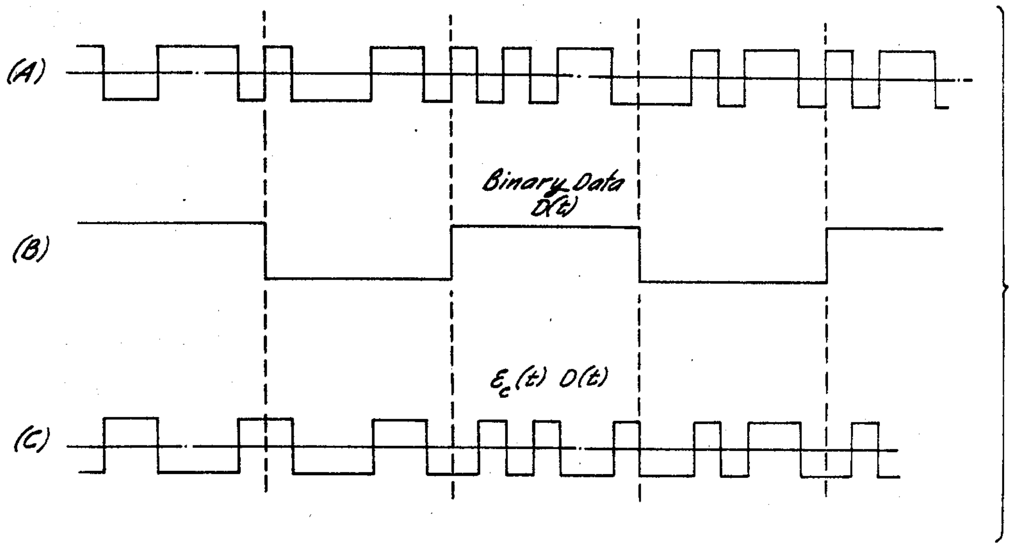

FIGURES 8A through C illustrate in lines characteristical data representative of the operation of the device shown in FIGURE 7 plotted against time and in vertical alignment for time correspondence.

Figure 1:
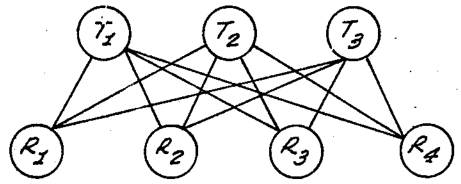
FIGURE 1 illustrates schematically geometric relations between different transmitters and receivers.

Proceeding now to the detailed description of the drawings, the principal problem to be solved will be explained best with reference to FIGURE 1. A given number of transmitters such as the three transmitters T1, T2 and T3, each will at times communicate with any one of the four receivers of R1, R2, R3, and R4. It shall be assumed that a common channel, i.e., a single carrier band is to be used for all the communications between these receivers and these transmitters.

Though the illustration is a schematic one, the distances between the transmitters and receivers are illustrative of possible cases in reality. Assuming that the transmitters have similar power levels regardless with which receiver they communicate, it is apparent that the power level must be sufficient that for example, the signals broadcasted by the transmitter T1 will be received by receiver R4, and the output of transmitter T3 must be sufficient to be received by receiver R1. No problem will arise if the transmitter T1 communicates with the receiver R1 even if simultaneously the transmitter T3 communicates with the receiver R4 on the same frequency band. The crosstalk will be relatively low since each receiver is much closer to its communicating transmitter than to the interfering transmitter. In other words, when the transmitter T1 communicates with receiver R1, the signals broadcasted by transmitter T1 will be received also by all the other receivers. However, the travel path between the transmitter T1 and the receiver R4 is so large that substantially receiver R4 will receive only the signals broadcasted by transmitter T3, while most of the signals for transmitter T1 will be suppressed in receiver R4 as noise. The interference of transmitter T3 with the communication between transmitter T1 and receiver R1, may also be below the permissible noise level.

However, the situation is different if for example the receiver R1 is to receive the output of transmitter T3, and if simultaneously for example, the receiver R3 is to receive the output of transmitter T2. In this case, the receiver R1 receives relatively weak signals from the intended transmitter T3 while it receives also the relatively stronger signal from the interfering transmitter T2. Thus, at receiver R1, the interfering signal is stronger than the signal containing the desired information.

Similarly, the receiver R3 will receive about equally strong signals from the transmitters T2 and T3, so that the desired signal and the interfering signal have similar strength and may not be distinguishable. If one considers all possible cases of the relative strength of desired signals and of interfering signals, and if one considers further that any transmitter shall communicate with any receiver at any time, unless such receiver communicates with a different transmitter already, then it can be seen that in most cases the interference is as strong as or stronger than the intended transmission.

The system to be described in the following involves a multiplexing technique which permits substantial elimination of interference of such nature; particularly, the interference with an established transmission and resulting from transmission by a transmitter that is farther or closer to the receiver than the transmitter to be received, is to be suppressed even though the two transmitters broadcast on the same band.

Figure 2:
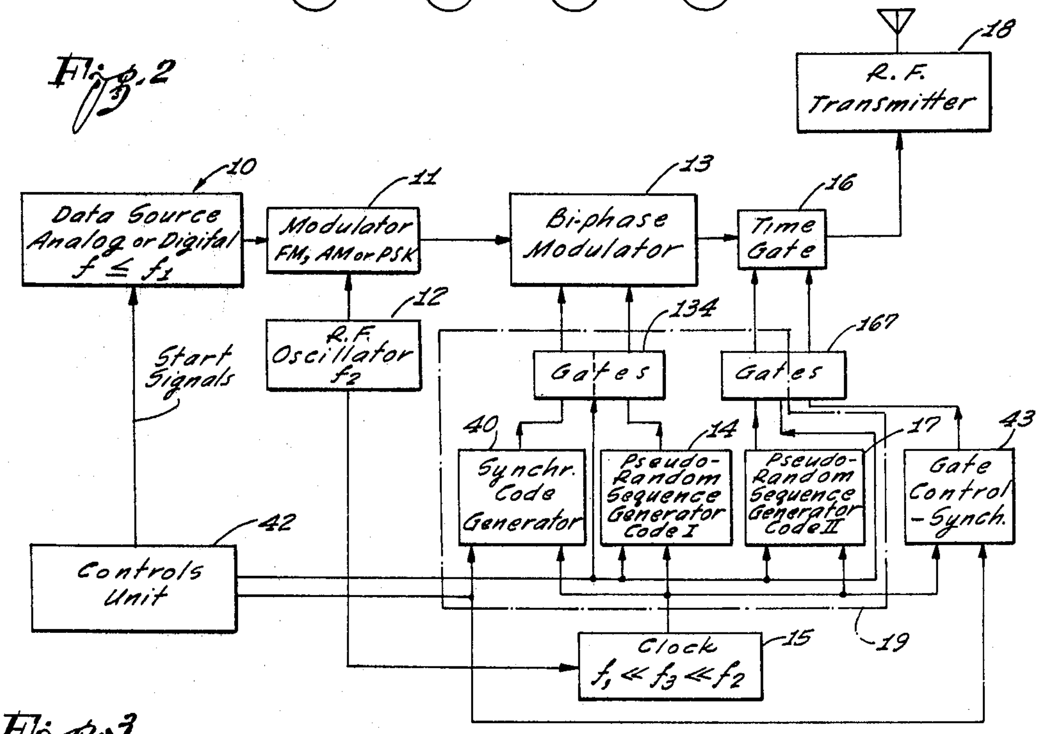
FIGURE 2 illustrates somewhat schematically a block diagram of a transmitter operating within a system which is the preferred embodiment of the invention.

Proceeding now to the description of FIGURE 2, there is shown a data source 10 of general design. The data source may produce analog signals such as voice or video communication, or it may produce digital signals for pulse code transmission. In any event, it is assumed the frequency spectrum of the data source does not exceed a frequency $f_1$. The output signals of data source 10 are fed to a modulator 11 receiving a carrier signal from a radio frequency oscillator 12. The radio frequency oscillator has a characteristic output frequency $f_2$ which may well be in the megacycle range. The modulator 11 is either an AM or FM modulator, however, the frequency modulation is preferred. This type of modulation will be used in case the data source is analog.

In case the data source is digital, the modulator 11 will be a phase shift keying (PSK) modulator. Assuming that the modulation is an FM one, the output of modulator 11 will be a signal of the type shown in FIGURE 5A.

The output signals of modulator 11 are next fed to a biphase modulator 13. The biphase modulator 13 additionally responds to binary modulator signals, in that it permits unmodified passage of signals as they are derived from modulator 11 in case the modulating digital binary signal is 0, whereas the biphase modulator 13 shifts the input signal by 180° in case the modulator signal input is 1 or L. During normal transmission presently described, the modulator signal for the biphase modulator 13 is being derived from a code generator 14 developing a binary code sequence, called code I.

The generator 14 is one of the type which shall be described in the following and which has been mentioned above as a pseudo random code sequence generator. The meaning of the term "pseudo random sequence" within the presently described concept shall be repeated briefly. It is known that a true random signal such as noise $N=N(t)$ has an autocorrelation function $$\phi(\tau)=\frac{1}{T}\int_0^t N(t)\cdot N(t+\tau)\cdot dt$$

that is substantially zero for the time shifts $\tau\neq 0$ while the autocorrelation function $\phi(\tau)=1$ for $\tau=0$.

Figure 4:
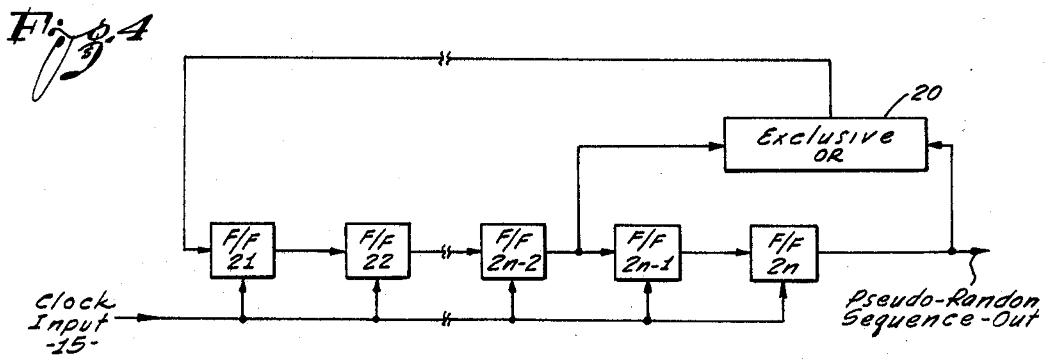
FIGURE 4 illustrates schematically a block diagram of a pseudo random sequence generator instrumental for practicing the invention.
Figure 4A:
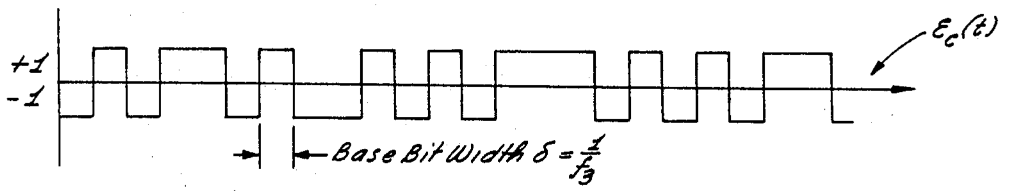
FIGURES 4A and 4B shows characteristics for pseudo random sequences.
Figure 4B:
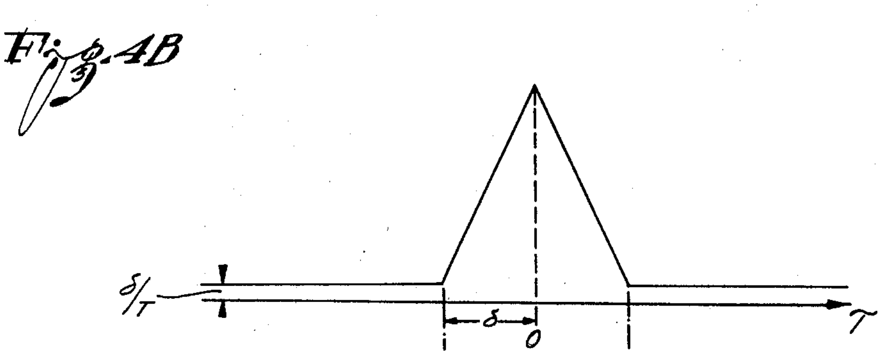

A pulse sequence $Ec(t)$ such as shown in FIGURE 4A and produced by random gating a train of periodically produced pulses each having pulse width $\delta$, exhibits a similar autocorrelation function $\phi(t)$. Since such pseudo random pulse sequence is repeated after a period of time T, the autocorrelation function is not zero but $\delta/T$ for phase shifts $\tau\neq 0$. This autocorrelation function is shown in FIGURE 4B. It is apparent, that for periods of time T very large relative to the pulse width $\delta$, this ratio $\delta/T$ is only very small. For practical purposes it will be smaller than $10^{-3}$ which value renders such correlation comparable with the approximate zero autocorrelation of a true random sequence. Furthermore, the time T can be lengthened as well without any difficulties whatever. Thus, theautocorrelation outside of the zero shift can be reduced below any desirable level. A pseudo random pulse generator, therefore, is a pulse generator which produces predetermined pulse sequences $E(t)$ of unique configuration, which configuration is reproducible, but having an autocorrelation function which is substantially 0 for all phase shift $\tau\neq 0$, and 1 for phase shift $\tau=0$.

FIGURE 4 illustrates by way of example a network capable of producing such pseudo random binary sequences. There are provided a number of switching stages such as bistable electronic elements for example, flip flops, respectively denoted with reference numerals 21, 22 and **2*n*—2, 2*n*—1 and 2*n***. Thus, there are altogether *n*— such stages, and they are interconnected to form a shift register type chain of bistable elements. The number *n* of stages is immaterial but this number determines the maximum periodicity of the sequence produceable with such system.

Each storage element of flip flop stage is connected in such a manner that the content of each stage is transferred to the succeeding stage, each time a clock pulse line is pulsed. This shift register generator differs from the ordinary shift register in that the outputs of two or more stages are processed and fed back to the input of the first stage. The feedback operation is that of a "modulo 2" addition, performed here by an "exclusive or" gate 20.

In the specific generator illustrated in FIGURE 4, a loop is provided in that the output of stage **2*n*—2, and the output of the last stage 2*n* are being fed to the "exclusive or" gate 20. In other words, the "or" gate 20 will produce an output signal only when the switching states of stages 2*n*—2 and 2*n* are different. In this case, "or" gate 20 produces an output signal, causing the respective next clock pulse to activate the first stage 21. In case stages 2*n*—2 are either both "on" or both "off" no output is produced by the "exclusive or" gate 20**, and the respective next clock pulse will be suppressed.

The pulse sequence produced, i.e., the pulse sequence derivable from the output side of, for example, the stage **2*n*** has a pseudo random character as described above. If as stated, the number of stages if *n*, the maximum number of clock pulse bits before the sequence repeats itself is **2*n*—1**. For example, if the number of stages $n=20$, this pseudo random signal generator has a repetition rate frequency of 1,048,576 bits. If the time pulse frequency is 1 megacycle ($\delta=10^{-6}$ sec.) then the sequence repeats itself in about one second.

For the autocorrelation function $\phi$ of such a sequence, one obtains the value $T=\delta\cdot(2n-1)$, with $\delta/T$ now being $10^{-6}$ which approximates zero sufficiently, so that the pulse sequence can be regarded as having random character. Different sequences can be obtained from the same register by connecting the feedback taps to different stages. However, only certain connections are permissible if the sequence length is to be 2*n*—1 bits. More than two feedback taps can also be used, however, there must always be an even number of taps, and one of the taps always has to come from the last stage in the register.

This rather simple mode of changing the sequence is important for reasons to be described more fully below. It can be said, however, that the cross correlation of two long pulse sequences produced with two different generators is approximately zero. The fact that the cross correlation of pulse sequences produced with two different generators is zero, is an important aspect for implementation of the invention.

Figure 5:
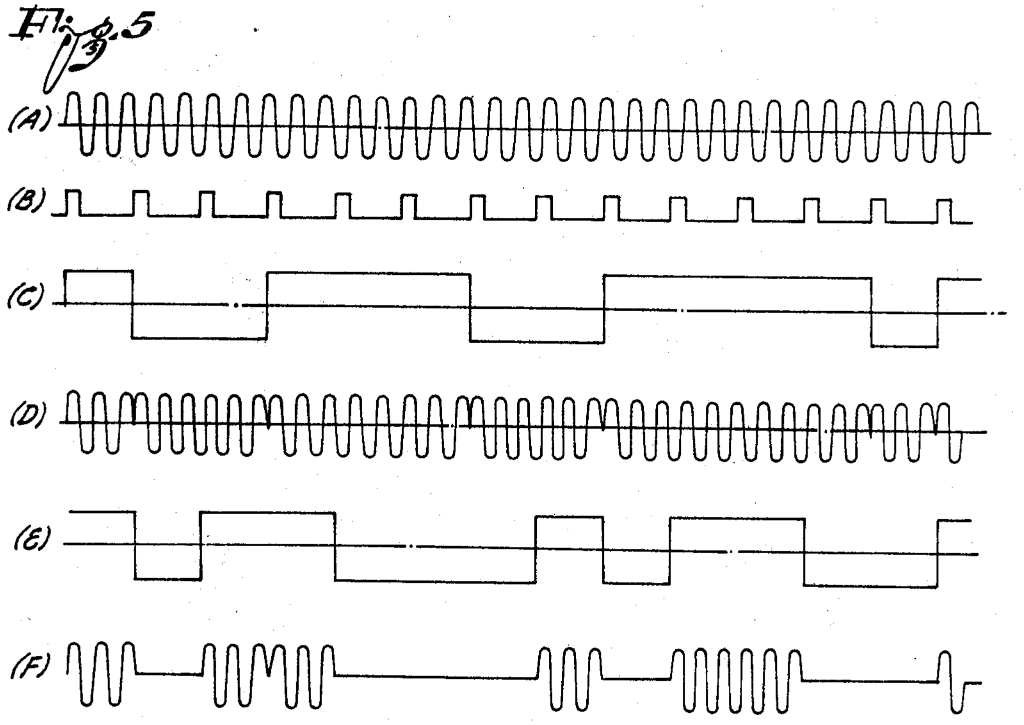
FIGURE 5 illustrates the outputs of various components of the system of the invention at corresponding times.

Proceeding now with the description of FIGURE 2, the binary code generator 14 is such a generator of the type shown in FIGURE 4, and the pulse sequence produced by generator 14 is called code I and is depicted in FIGURE 5C. During normal transmission, the biphase modulator 13, therefore, modulates the FM modulated carrier in accordance with the pseudo random pulse sequence produced by the generator 14.

The code generator 14 receives its clock pulses from clock 15 (pulse train FIG. 5B), and it shall be mentioned that the clock pulse frequency $f_3$ is at most $\frac{1}{10}$ of the carrier frequency $f_2$.

With regard to the clock pulse sequence as derived from clock 15 and illustrated in FIGURE 5B, it should be mentioned that the time scale thereof in comparison with the time scale of the FM modulator output as shown in FIGURE 5A, is not shown in their true relationship. The clock pulse frequency $f_3$ of the pulse train in FIGURE 5B and the frequency $f_1$ of the signal shown in FIGURE 5A are to be related by a ratio of about, $$f_3:f_1=1:10$$

It is advisable to use a frequency divider as a clock, and the oscillations of RF oscillator 12 are fed to device 15 which may include a counter. The clock pulses produced by frequency division have a precise frequency and phase relationship with the carrier wave, although this relation is not actually required for proper operation. The clock pulse frequency $f_3$ is well above the intelligence frequency limit $f_1$.

In view of this relation among the several frequencies, the frequency spectrum of the signal leaving the biphase modulator 13 is substantially expanded, and the band is substantially determined by the two limit frequencies, $f_2+f_3$ and $f_2-f_3$. This band having a width of $2f_3$ is substantially larger than the base band of $2f_1$ as resulting from the FM modulation of the RF carrier. The signal leaving modulator 13, therefore, has a so-called spread spectrum. For example, the base band may occupy only 6 kc. ($f_1=3$ kc.) sufficient for regular voice communication. The frequency $f_3$ may be IMC, thus giving more than a hundred-fold spreading of the carrier band spectrum.

In the spread spectrum transmission employed by the device in accordance with the present invention, the transmitted signal occupies a band width many orders of magtude greater than the base band information. Therefore, for the same transmitted power and same base-band width, the spectral power density of the spread spectrum transmission will be many orders of magnitude less than an amplitude modulated signal. Further, the spread spectrum signal will have statistical properties closely approximate those of random thermal noise.

A portion of the output of biphase modulator 13 which is the FM and biphase modulated carrier is illustrated by way of example in FIGURE 5D. It will be appreciated, that a change-over from L to 0 or from 0 to L within the code sequence (code 1) shown in FIGURE 5C, the output of FM modulator 11 as shown in FIGURE 5A is being shifted by 180°.

At this point, however, it should be mentioned that the output signal as developed at the output side of modulator 13 is a continuous signal. If, for example, this signal were to be broadcasted from the transmitted T1 (FIGURE 1) and to be received by receiver R4, such signal will, of course, also reach the receiver R1 and naturally at a much stronger power level. If the receiver R1 at the same time is to receive within the same band a differently coded signal from the transmitter T3, then the rather strong signal from the transmitter T1 would appear as very strong noise in receiver R1 drowning out the weak signal from transmitter T3. Therefore, different measures have to be provided in order to avoid suppression of a proper signal received from a distantly positioned transmitter by the "noise" resulting from the interfering transmission of a closely positioned transmitter using the same band.

Accordingly, there is provided a time gate 16 which is in effect a simple on-off switch having, of course, a sufficiently large pass band width. The gating signal for this time gate 16 during normal operation is now derived from a second binary code, pseudo random sequence generator 17 furnishing a code II which is different from code I, whereby "different" means that the cross correlation function between code I and code II is substantially zero.

A portion of the output of this code generator 17 by way of example is depicted in FIGURE 5E. Since the code II generator determines when the transmitter is to be turned on and when it is to be turned off, it has, as far as the time gating is concerned, a duty cycle which is the ratio K of "on time" to "on time plus off time." Accordingly, the transmission of the spread spectrum-modulated carrier is interrupted in accordance with a pseudo random sequence whereby the factor K determines the relative time proportion during which signals are actually transmitted.

The output of time gate 16 is shown in FIGURE 5F. This output is the signal which will be transmitted finally by the radio frequency transmitter 18.

The two code generators 14 and 17 together with several additional networks, which will be described more fully below, pertain to a code block 19. This code block 19 defines a particular combination of code generators which includes the two generators for producing the code I and II. These two specific pseudo random codes are assigned for communication with a specific receiver. Whenever the transmitter presently described is to communicate with the receiver having assigned to it code I and code II, this code block 19 is connected in circuit so that the pseudo random sequence generator 14 feeds code I to the modulator input terminal of biphase modulator 13, while the pseudo random sequence generator 17 feeds code II to the gating terminal of gate 16.

The connection of the code block unit to modulator 13 and gate 16 is symbolically indicated by gates 134 and 167 governed by control signals from a general controls unit 42 selectively opening and closing the gates to permit or to prevent passage of the code I and code II sequences.

It will be appreciated that the dotted line in FIGURE 2 outlines specifically the elements which are assigned to a specific receiver at the transmitter, and this block 19 may as a unit be exchanged for a different group or unit of elements in case the transmitter is to communicate with a different receiver.

Such a different code block includes a first code generator for connection to the biphase modulator 13 and a second code generator for connection to the time gate 16. Such exchange of code blocks can be had by selective switching devices including the gates 134 and 167.

It will be recalled that such pseudo random code generators may all be implemented by switching stages as shown in FIGURE 4. Different code sequences can be produced with the same generator by varying the connections to the exclusive or gate. Thus, a different code block in the transmitter may include the same generators 14 and 17 but selectively the connections therein are being changed to establish different code sequences for communication with the different receivers. Preferably, the modulators 11 and 13, the time gate 16, the radio frequency transmitter 18 with antenna and the local RF oscillator 12 as well as the clock pulse source 15 are elements in this particular transmitter operating during all transmissions. It is principally immaterial whethar to use the same or a different clock for each one of the different code blocks. The invention does not depend on any similarity in the rates of producing the random sequences, but from standpoint implementation it is advisable to use the same clock source, so that the spread spectrum width is the same during all transmissions to the different receivers.

One could assign, however, a specific data source to a specific code block, i.e., it is conceivable that the transmitter will only enter into a voice communication with one receiver and into a digital data communication with a different receiver in which case also the FM modulator has to be exchanged for a PSK modulator. This completes the description of the transmitter as far as regular transmission is concerned.

Figure 3:
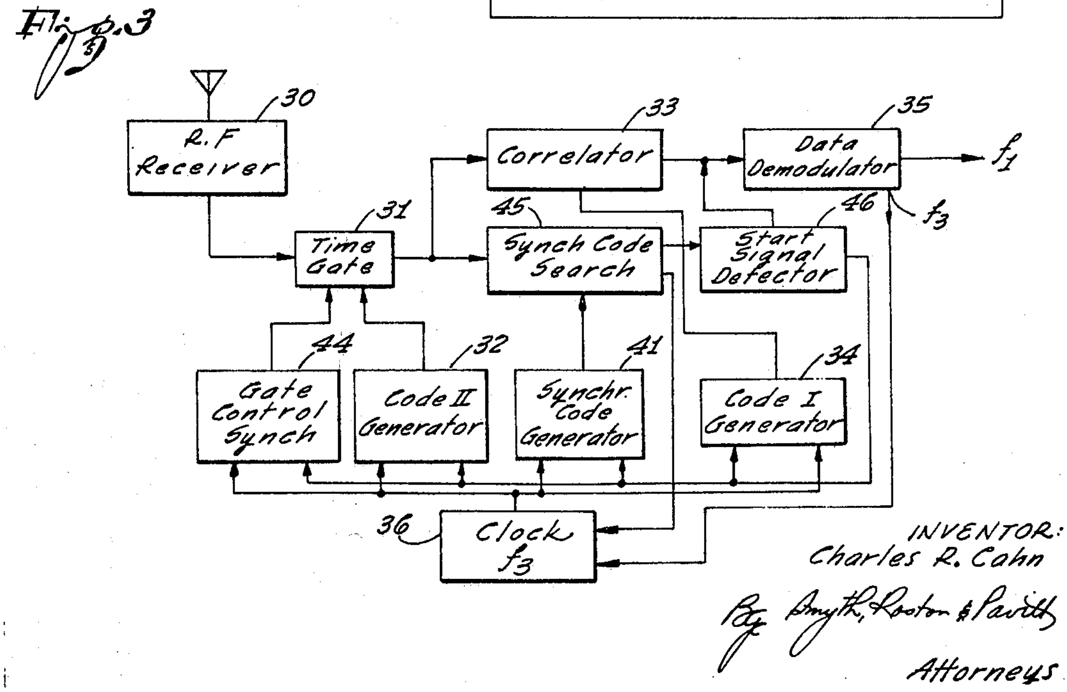
FIGURE 3 illustrates somewhat schematically a block diagram of a receiver destined to communicate with transmitters of the type illustrated in FIGURE 2.

Before describing the additional elements in FIGURE 2, reference is to be made to FIGURE 3 illustrating a specific receiver which is respectively associated with a specific code block 19 shown in FIGURE 2 on the transmitter side. The receiver includes the usual radio frequency receiving device 30 which includes a suitably tuned detector circuit capable of being tuned to the band as defined by the frequencies $f_2+f_3$ and $f_2-f_3$. The RF output of the receiver 30 is fed to the signal input terminal of a time gate 31; the gating terminal of time gate 31 receives gating signals from a binary code generator 32.

The binary code generator 32 produces the code II which is a precise replica of the code II produced by generator 17 at the transmitter side. The generator 32 receives a train of clock pulses from a local clock pulse generator 36. During normal intelligence transmission, the signal output of the time gate 31 includes the signal train as outlined in FIGURE 5F. During the transmission blanks resulting from code II modulation (time gating) in the transmitter, only noise and interference reaches the receiver, so that the reception is interrupted by the time gate 31 in synchronism with the time gating of the transmission. The output of time gate 31 may, however, include some crosstalk from interfering transmitters since other transmitters, though also time gated at different pseudo random sequences will still interfere during short periods of time. The probability and frequency of occurrence of such interference will be discussed below.

The output of gate 31 is passed on to a correlator 33. The correlator 33 basically is the functional opposite to the biphase modulator 13, in that during certain periods of time it passes the signal it receives while at other times it shifts the output signal of gate 31 by 180°. The function of the correlator 33, therefore is to multiply the output of a generator 34 furnishing the code I as stored reference, with the time gated signal received. Additionally, the signal is integrated, i.e., a reference signal and the time gated signal are correlated which means production of the average product or the integral of the instantaneous product of the two input signals. The sequence of passing or shifting is determined by the binary code generator 34 producing precisely the code I as it is being produced by the generator 14 at the transmitter side. Thus, the generators 14 and 34 may be of identical design and structure.

The output signals of correlator 33 are then passed to the data demodulator 35 for retrieval of the FM modulation of the carrier.

Of course, there is the requirement that the pseudo random codes at transmitter and receiver sides have to be maintained at precise synchronism. This requirement has two aspects, one is that if the generators 14, 17, 32 and 34 are of the type outlined with reference to FIGURE 4, the two generators at the receiver side have to be started at the same time and the two generators at the transmitter will also have to be started simultaneously. Furthermore, the starting of the two receiver side code generators 32 and 34 must be delayed relative to starting of the two transmitter code generators 14 and 17 by a period of time which is equal to the travel time of the broadcast wave from the transmitter to the receiver. For example, in case the transmitter is 20 miles from the receiver the propagation delay is approximately 100 bits for a one megacycle clock rate.

The other requirement is, that the clocking rate of operating the receiver code generators has to be in precise frequency synchronism with the clock running the code generators at the transmitter side.

Considering this latter requirement first, synchronism during transmission is attained in that a carrier wave signal is derived from the demodulator 35 and fed to the local clock 36 of the receiver. The clock 36 may likewise be a frequency multiplier such as clock 15 in the transmitter. Thus, the two pseudo random sequence generators 32 and 34 are driven in precise phase lock relationship to the production of clock pulses at the transmitter, driving generators 14 and 17 therein. Next, the problem of synchronizing the starting generators 14, 17, 32 and 34 shall be discussed.

Stating the problem more generally, a specific receiver which may not be operating at a particular instant has to be called on for communication with a specific transmitter while at the same time other transmitters operate on the carrier band. For this purpose, a specific synchronization code is assigned to each receiver, and each one of the transmitters with which this specific receiver may at time communicate, therefore, is enabled to produce this synchronization code. Turning back therefore, to FIGURE 2, there is shown a synchronization code generator 40 which is a part of the code block 19 respectively associated with the specific receiver and having as operating codes, the above mentioned pseudo random sequences, code I and code II. The synchronization code produced by generator 40 is significantly shorter in length than the code length of any of the operating codes produced by generators 14 and 17.

The key to a useful random access system of the type under discussion is a rapid means for achieving synchronization of the pseudo random code generators, used for biphase modulating and time gating the carrier. For validity of the statistical analysis based on random codes, the pseudo random codes should be relatively long. On the other hand, to synchronize the code generators initially necessarily implies use of a relatively short code, so that all possible phases of the code may be searched out by the receiver. The short codes to be employed must have a very important property, namely, that the cross correlation between different codes, long and short codes, should be close to zero, and the autocorrelation of any synchronization code should be nearly zero except for the main peak at zero time shift. This properly ensures that the receiver will respond only to the code intended for it and in the proper time phase.

In addition to the correlation property of the short codes, the random access feature must be maintained. That is, it should be possible for a new transmitter to send a synchronization code through the channel without interfering with transmissions already established, within the channel capacity. This means, of course, that the synchronization codes must be time gated. It may be noted that the synchronization code periodicity will not affect the crosstalk between two or more normally operating transmitters, as far as interference with the nonrepetitive pseudo random code signals is concerned. Hence, synchronization codes with the system duty cycle will appear as random interference to a receiver already operating in long code.

Ideally, the time-gated short synchronization codes should have the desired correlation property regardless of how one such code is suppressed in part by other codes in the channel. This is very difficult to ensure, however, in contrast to the random correlation existing between the short synchronization code and the long pseudo random code. Because of this, emphasis has been devoted primarily toward solving the problem of allowing a transmitter to synchronize the intended receiver without affecting the remaining receivers or established transmissions.

The general controls unit 42 in the transmitter initates the selective transmission by this transmitter for communication with the specific receiver as shown in FIGURE 3. In particular, the controls unit first causes the transmitter to transmit the synchronization code and subsequently thereto the transmitter will be changed over to normal data transmission with code I and code II modulations.

Figure 6:
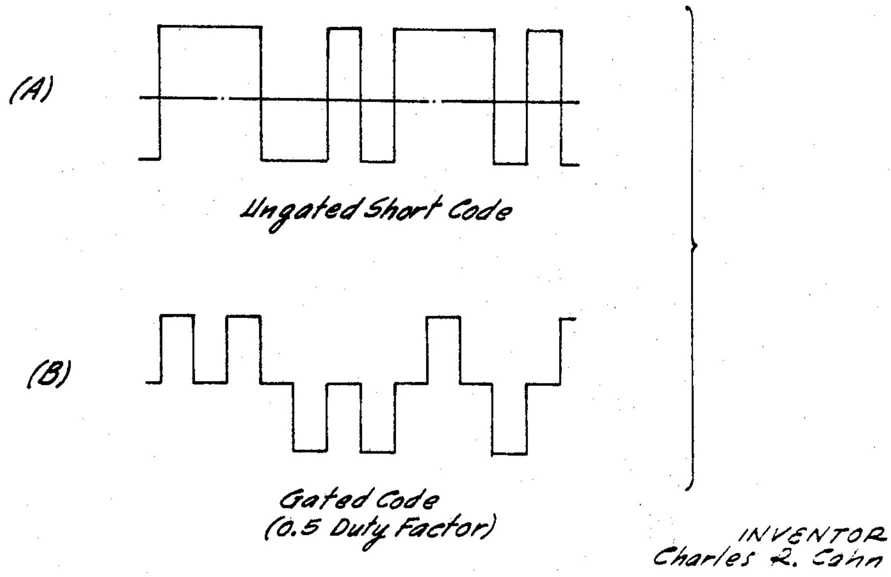
FIGURES 6A and 6B illustrate synchronization codes for the transmission system in accordance with the invention.

For this purpose the controls unit 42 first initiates a starting pulse with which the synchronization code generator 40 is started and the controls must also operate the gate 134 to connect the generator 40 to biphase modulator 13. Accordingly, the pseudo random sequence of binary pulses defining the synchronization code is fed to the biphase modulator 13. Concurrently thereto, the controls unit 42 starts a gate control unit 43 which may be a simple 1:$K$ frequency divider receiving the clock pulses from source 15 at its input. The output signals of divider 43 are passed to the gating terminal of time gate 16, so that the controls unit 42 opens the gating path provided by gate 167 between elements 43 and 16. FIGURE 6A illustrates as an example a portion of a synchronization code as furnished by generator 40 while FIGURE 6B illustrates the effect of the time gating on the code. The radio transmitter 18 with antenna broadcasts the RF signal biphase modulated in accordance with the synchronization code furnished by the generator 40 and with a time gating as produced by the gate control 43.

At first, no data modulation will accompany this signal, so that the transmission does not include a base band. After a period of time sufficient to ensure that the receiver is synchronized, a starting signal such as tone of a particular frequency or a code within the permissible intelligence band is used to modulate the carrier. At a predetermined instant, such as simply after a predetermined period of time of such tone transmission, the controls unit 42 causes the starting signal to stop and the generators 40 and 43 are stopped, likewise. Additionally, the two generators 14 and 17 are started concurrently to commence the production of codes I and II for normal transmission. Concurrently, thereto, gate 134 switches the input of modulator 13 from 40 to 14 and gate 167 switches the gating terminal from 43 to 17. It will be apparent to one skilled in the art, that the implementation of this controls unit 42 is quite simple and does not need elaboration. In effect this unit is to produce accurately time-spaced control pulses and switching signals, and the accuracy required for these signals is determined by the bit length of clock 15.

At the receiver side, there is provided a continuously operating gate control unit 44 operating normally in synchronism with the gate control unit 43 of the transmitter, so that the receiver time gate 31 is turned on and off in anticipating synchronism of the transmission of the synchronization code by a transmitter. Gate control units 43 and 44 are similar in function and may be similar in design and structure accordingly.

The output of the time gate 31 is fed continuously i.e., during periods of time that the receiver is not receiving intelligence, to a synchronization code detector 45. This synchronization code detector 45 is connected additionally to a synchronization code generator 41 which produces continuously the unique synchronization code assigned to this receiver. The detector 45 searches continuously for the specific synchronization code assigned to this particular receiver.

Based on the known performance of existing hardware, the receiver is capable of searching at about 2000 bits per second while maintaining the presumed $S/N$ threshold for analog voice. If a duty factor of 0.125 is employed, and if the synchronization codes are, for example, 4088 bits long, as far as receiver search is concerned, a synchronization time of two seconds must be allowed whenever the synchronization code is transmitted.

It should be remembered, however, that the synchronization code has to be used only once at the beginning of a two-way communications between two terminals. The reason for this is that reversing the direction of communication requires only a small time search to adjust for range. For example, at a range of 20 miles, the code displacement due to propagation delay is about 100 bits, for a 1 mc. clock rate of code sequence generator. The required time search thus covers 200 bits and occupies only 0.1 second. It would be 0.3 second to cover the 600 bits for a 3 mc. clock rate. This mode of operation, in addition to providing rapid synchronization after the initial contact, reserves the synchronization codes for infrequent use only.

The latter observation is of significance since it means a low probability of two transmitters trying to synchronize with the same receiver by using the same short code at the same time. If at the receiver, the undesired sync transmission is much stronger than the desired, the latter is suppressed if the code bits overlap significantly. The probability of this is roughly equal to the duty factor (for example 0.125). The quantitative effect this will have on synchronization reliability depends on the disposition and number of transmitters in the area, and the frequency with which the initial synchronization is required. As an example, with a maximum worst case loading of 8 simultaneous signals ($f_3$=1 mc. is presumed with 0.125 duty factor) each lasting 1 minute on the average (total two-way conversation) in long code, a short code will be used once every 7.5 seconds. Presuming a 0.125 duty cycle, the probability of failure to synchronize with the receiver then is (.125)(2/7.5), or 0.033. In other words, the synchronization reliability is 96.7% for the presumed parameters.

In view of a relatively short repetition rate of the synchronization code, the detector 45 will respond to the repeated broadcasting of the synchronization code assigned to this particular receiver, with little delay. As soon as this synchronization code is detected, it is passed as decoded output in the starting signal detector 46. The broadcasting of the start signal within the data band during the synchronization period provides in effect for a transmission starting synchronization so that at a specific instance as determined by this start signal broadcast from the transmitter, gate control 44 is stopped and the two generators 32 and 34 are started. The delay between starting of the transmitter code generators and the receiver code generators equal the propagation time.

Now the transmission of data proper can commence as synchronous operation of generators 14–17 and 32–34. The code length as produced by either one of the code generators 14, 17, 32 and 34 can be quite extensive, and it is within the realm of the possibilities that the code length exceeds the time of transmission of regular messages. The normal operation at the receiver is a phase coherent correlation detection with a matched replica of the biphase modulation code (code I) to restore the relatively narrow intelligent base band width. This is the primary function of correlator 33. The base band is then recovered by demodulator 35.

In view of the utilization of two pseudo random codes, during normal transmission, an enhancement of the signal to interference ratio is obtained. This enhancement is called the processing gain, and it depends on the band width ratio, i.e., the spread band width divided by the intelligence band width: $f3/f1$.

In order to determine the number of transmissions which can simultaneously occupy this particular channel, the crosstalk produced by interference from the undesired transmitters shall be computed briefly. Actually, the number of simultaneous transmissions will depend on the geometry of terminal locations, i.e., the distances as between the various transmitters and the various receivers operating at the same time. For a brief orientation a few representative cases shall be discussed.

It shall be presumed that the codes during normal transmission are long, non-repetitive pseudo random codes of the type discussed above. At first, it shall be considered that no limiter is employed at the receiver side. If all transmitters and all receivers are time gated by codes having a duty factor K, then the signal-to-noise ratio at the output of the time gate 31 in the receiver is the same for ungated transmitters, since the average power of each signal is reduced by the same factor K. Furthermore, it has been found, that the "gating noise" is negligible. Thus, there one can write the equation:

$$\frac{S}{N}=3D^2\frac{f3}{2f_1}\frac{1}{n-1}$$

In this equation, $n$ is the number of simultaneous signals in the channel, including the desired one; $3D^2$ is the usual FM improvement factor and D may, for example, be 2. $f_3$ may be 3 megacycles and $f_1$=3 kilocycles for voice communication.

One can now state as a requirement, that the signal-to-interference ratio for such $n$— simultaneous transmission must not exceed the signal-to-noise ratio of an ungated receiver without any interfering transmissions. Based on practical experience, such $S/N$ value is 17 db at threshold for $D$=2. With these values, the above equation can be used to calculate the maximum number $n$ of simultaneous transmission to be $n$=121.

In case large power ratios and unfavorable geometry are to be handled, "hard" limiters have to be employed in the channel. An exact solution is not necessary since the composite interference appears like a Gaussian noise and the usual limiter suppression factor is about 1 db. This means a 20% reduction in the maximum number of simultaneous signals down to approximately $n$=100.

A more significant evaluation of simultaneous signal capability is the ability of a different receiver to receive a weak signal in the presence of strong interfering signals from other transmitters placed more closely in the vicinity of the receiver. This computation corresponds to the "worst case geometry" since less extreme geometries will allow more simultaneous transmissions.

The basic concept is that the weak signal is turned on while the strong signals are turned off on a statistical basis because of the essential random time gating of each signal. The weak signal is brought to unity level by the action of the hard limiter in the receiver. On the other hand, if one or more of the strong interference signals are turned on, the desired weak signals will be completely suppressed in the limiter, and the interference is brought to unity by the limiter. Thus, the crosstalk from the interference signal manifests itself in two distinct ways.

The first way is that the desired signal suffers amplitude suppression due to elimination of portions of its wave form, and, second, interference is introduced at unity level in place of the suppressed portions of the desired signals. Both effects can be computed from the time gating statistics.

Again it may be assumed that the duty cycle factor is K, and that there is a total number of $n$ signals to occupy the channel which number includes the desired signal. The probability that the weak signal is turned on but not suppressed in any instance is simply given by the expression $P=K.(1-K)^{n-1}$. This statistical average states the amplitude reduction of the desired signal due to its own time gating, and the suppression induced by the interference signals.

In the receiver interference is present whenever the desired signal is turned on but suppressed, the fraction of time being $K-P=K(1-(1-K)^{n-1})$. The above computations now suffice to specify the receiver performance. The signal-to-interference ratio in the receiver prior to enhancement by a factor equal to the processing gain is $$\left(\frac{S}{N}\right)\text{pre-correlator}=\frac{(K(1-K)^{n-1})^2}{K-K(1-K)^{n-1}}$$

Applying the processing gain of spread spectrum one obtains $$\left(\frac{S}{N}\right)_{\text{out}}=3D^2\frac{(f_3)}{2f_1}\frac{K(1-K)^{2(n-1)}}{1-(1-K)^{n-1}}$$

This equation gives the output audio signal-to-noise for worst case geometry and may be used to compute the maximum number of signals simply by introducing the known phase lock discriminator threshold for the deviation D. As example, the previously assumed parameters, $f_3$=3 megacycles, $f_1$=3 kilocycles, $D$=2 will be utilized. The duty factor K is chosen to be 0.1. The signal-to-noise ratio at threshold is again 17 db. Then the solution for the maximum number of simultaneous signals in the "worst geometry case" is found to be 14. In case the system utilizes simplex operation this corresponds to 28 simultaneous users, half of which are receiving and half of which are transmitting in the given time.

As a second example, suppose the band width $f_3$ is reduced to 1 mc. without changing any of the other parameters, then the computation of the last one of the equations yields a maximum number of signals equal to 9 which means 18 simultaneous users of a simplex system. It will be observed from the above two examples, that the computed number of signals, i.e., simultaneous transmission, is not proportional to the band width. Reason for this anomaly is that the assumed duty factor K affects this number and should be somewhat lower in the wider band system to decrease crosstalk from a larger number of simultaneous signals.

Generally, it has been found that a choice of parameter, $f_3=1$ mc. and $K=.125$ represents a useful system minimizing spectrum occupancy and providing reasonable spectrum utilization.

Actually, as high a duty factor as possible is desirable to minimize synchronization time and maximize average power transmission.

Proceeding now to the description of the FIGURES 7 and 8A through 8C there is shown a possible modification of the inventive system illustrating that the sequence of modulation is not essential as far as practicing the invention is concerned. There is shown a data source 60 producing binary digits described as the function D($t$). Within this function D($t$) can either be 1 or 0. A code generator 61 produces a pseudo random binary sequence E$c$($t$) of the type illustrated in FIGURE 7A. The two signals are combined in a binary modulator 62 operating by way of binary addition which process is also known as a modulo 2 addition. One can also consider this binary modulator 62 as an "exclusive or" gate.

As a result of this function of modulator 62, the output thereof is a pulse sequence, such as the sequence E$c$($t$) but which is phase shifted by 180° i.e. inverted whenever the data source produces "one" while the sequence is unmodified when the function D($t$) *is* "zero." As far as the pulse sequence is concerned, this is substantially similar to the operation of an "exclusive or" gate.

The output of this binary modulator 62 is then fed to a balanced radio frequency modulator 64 receiving radio frequency oscillations from an oscillator 63. The output of this modulator 64 is then passed to a time gating unit of the type described above with reference to reference numeral 16.

When a sequence to which data have been added in such a manner is correlated in the receiver with an identical sequence E$c$($t$) which has not been perturbed by data, the polarity of the correlation of output will reverse the data rate and the data can be recovered by such correlation.

At the receiver side, the signal is data demodulated after correlation.

The invention is not limited to the embodiments described above, but all changes and modifications thereof not constituting departures from the spirit and scope of the invention are intended to be covered by the following claims.

What is claimed is:

1. The method of communicating between a first transmitter station and a first receiver station by means of a carrier band simultaneously used for communication between a second transmitter station and second receiver station, comprising the steps of, time gating said first and second transmitters in accordance with first and second psuedo random sequence codes having zero cross correlation;

respectively producing replicas of said first and second sequences in said first and second receivers at phase shifts relative to the production of said sequences in said transmitters corresponding to the respective distances between first transmitter and receiver and between said second transmitter and receiver; and time gating said first and second receivers in accordance with said phase shifted sequence replicas.

2. A transmission system which includes a plurality of transmitters and receivers, each transmitter providing and transmitting a carrier modulated spread spectrum signal which includes an intelligence band and a pseudo random pulse sequence band, each receiver including means to separate from the spread spectrum signal received, a particular psuedo random sequence band for recovery of the intelligence band, the combination comprising:

gating means in each of said transmitters and said receivers, respectively governing the passage of spread spectrum signals therein;

a plurality of pseudo random sequence generators, one in each of said receivers, each generator producing a different pseudo random code sequence, whereby the cross correlation between any two code sequences is substantially zero and the auto correlation of any code is similar to that of noise, the generator in each receiver respectively connected to the gating means in such receiver for controlling the passage of spread spectrum signals therein at pseudo random time gating as defined by the code sequence produced by the generator;

a plurality of first means in each of said transmitters for producing each of said psuedo random code sequences, one at a time, as gating signals for the gating means in such transmitters;

means in each transmitter connected for selectively connecting one of the plurality of first means in the transmitter to the gating means in the transmitter, to operate the gating means in accordance with the pseudo random code as produced by the one means of the plurality thereby permiting passage of the spread spectrum signals for transmission on a psuedo random basis as defined by the latter psuedo random code; and means in each receiver connected to receive the signals permitted to pass through the gating means of the receiver for phase tracking the production of code sequences by the generator in such receiver in accordance with the rate of code bits in each code sequence as produced in a transmitter.

3. A transmission system includes:

a plurality of independently operable transmitters and receivers, each transmitter providing and transmitting a modulated carrier signal which includes an intelligence band, each receiver including means receiving transmitted modulated carried signals and including means for recovering the intelligence band, the improvement comprising:

gating means in each of said transmitters and said receivers, respectively governing the passage of modulated carrier signals therein;

a plurality of psuedo random sequence generators, one in each of said receivers, each generator producing a different, reproduceable code sequence, whereby the cross correlation between any two code sequences is substantially zero, and the auto correlation resembles that of a true random sequence, the generator in any receiver respectively connected for controlling the gating means in such receiver; and a means in each of said transmitters for producing each of said psuedo random code sequences and connected for providing particular ones of the pseudo random code sequences to the gating means in the transmitter, as gating signals for controlling the transmission of the modulated carrier signals by the transmitter.

4. A transmission system wherein any one of a plurality of transmitters selectively and individually can communicate with any one of a plurality of receivers by means of spread spectrum signals, the combination comprising:

a plurality of pseudo random code sequence generators, one in each receiver, each generator producing a different code sequence, whereby the auto correlation of each and cross correlation between any two code sequences respectively correpsonds to auto correlation and cross correlation of true random pulse sequences;

means in each transmitter for producing each of said different code sequences;

time gates in each of said transmitters and said receivers, respectively operated by said generators and said code producing means for the control of passage or blocking of signals through the time gates;

means in each of said transmitters for feeding a spread spectrum band signal to said time gate in such transmitter, said signal including data modulation and psuedo random sequence modulator;

a correlator in each of said receivers connected to receive signals permitted to pass the time gate of the receiver, for removing from the signal received said psuedo random sequence modulation;

means in each transmitter connected to transmit the signals permitted to pass the time gate of the transmitter; and means in each receiver connected to receive transmitted signals and feeding them to the respective time gates of the receivers.

5. In a transmission system, a receiver which includes, a pseudo random code generator producing an extended, predetermined sequence of binary pulses, the auto correlation of which substantially corresponds to the auto correlation characteristics of true random pulse sequences;

a time gate in said receiver connected to be responsive to said binary pulses to permit passage of externally produced information signals which have been pseudo randomly modulated by the code and as they are received by the receiver in accordance with the sequence of pulses as produced by said generator; and means in the receiver connected to be responsive to a particular code received ahead of reception of information signals, to start said code generator.

6. In a transmission system, a transmitter which includes:

means for providing a spread-spectrum signal which includes a carrier, a first random sequence modulation signal determining the band width of a spread spectrum and a narrow intelligence base band;

means connected for time gating said spread spectrum signal in accordance with a second particular pseudo random code sequence;

and means connected for transmitting said time gated signal.

7. A transmission system wherein any one of a plurality of transmitters selectively and individually can communicate with any one of a plurality of receivers, the combination comprising:

a first plurality of pseudo random code sequence generators, one in each receiver, each generator producing a different code sequence, whereby the cross correlation between any two code sequences corresponds to the cross correlation of true random code sequences;

first means in each transmitter for selectively producing each of said different code sequences;

time gates in each of said transmitters and said receivers, connected to be respectively operated by said generators and said code producing means for permitting passage of signals in accordance with the respectively effective pseudo random code;

a second plurality of pseudo random code sequence generators, one in each receiver, each such generator providing a different code sequence, whereby the auto correlation and the cross correlation between any such code sequence and any other of said code sequences respectively corresponds to auto correlation and cross correlation of true random pulse sequences;

second means in each transmitter for selectively producing each of said several code sequences as produceable by said second plurality of generators;

means in said transmitters connected to the second means for providing a modulated carrier having a band which includes one of said code sequences and a data band; and a correlator in each of said receivers, governed by a sequence generator in said receiver as pertaining to said second plurality, for removing from the carrier signal received the pseudo random sequence modulation as resulting from said code modulation of said carrier in any of said transmitters.

8. A transmission system including:

a plurality of independently operable transmitters and receivers, each transmitter adapted to provide and to transmit a spread spectrum signal which includes an intelligence band and a pseudo random sequence band, each receiver including means to separate from the spread spectrum signal received a particular pseudo random sequence band for recovering the intelligence band;

gating means in each of said transmitters and said receivers, governing the passage of spread spectrum signals therein, respectively prior to transmission and subsequent to reception;

a plurality of pseudo random sequence generators, one in each of said receivers, each generator producing a different code sequence, whereby the auto correlation and the cross correlations between any two code sequences respectively resembles auto correlation and cross correlation of the random sequences, the generator in any receiver respectively connected for controlling the gating means in such receiver; and a means in each of said transmitters for producing each of said code sequences, one at a time, and connected to feed the code sequence as produced as gating signals for the gating means in such transmitter.

9. In a transmitter, the combination comprising:

a source of pseudo random sequence of binary signals;

a source of RF oscillations;

a biphase modulator connected receiving said RF oscillators as carrier for modulating said carrier with said binary signals;

a source of intelligence signals;

means connected for modulating one of said sequence and said carrier with said intelligence signals, and providing a modulated signal;

modulation means connected for combining by modulation said modulated signal with the other one of said sequence and of said carrier, and providing a spread spectrum signal;

a second source of a second pseudo random sequence of binary signals, having a cross correlation to said first sequence that corresponds to the cross correlation between true random sequences;

and a gate governing passage of said spread spectrum signal in accordance with said second sequence.

10. In a system as described, a transmitter, comprising:

first means defining a source of information signals;

second means defining a source of a first pseudo random code signal selected from a plurality of first pseudo random codes with substantially zero cross correlation and having auto correlation comparable with noise, and including a clock pulse source having frequency in excess of the frequency band of the information signals;

third means defining a source for carrier frequency signals;

fourth means connected to the first, second and third means for modulating the carrier frequency signals with the information signals and the first pseudo random code signals for producing a spread spectrum output signal;

fifth means defining a source of a second pseudo random code signal selected from a plurality of second pseudo random code signals with zero cross correlation and having auto correlation comparable with noise, and including clocking means having frequency below the carrier frequency;

gating means connected to the fourth and fifth means for receiving the spread spectrum output signals for passage when permitted in accordance with the characteristics of the second pseudo random code signals, as received from the fifth means for gate control; and means connected to the gating means for transmitting the signals having passed through the gating means.

11. A system as set forth in claim 3, each transmitter of the plurality including a code generator connected to cause transmission of a code selected from the plurality and ahead of transmission of intelligence;

means in each receiver connected to receive the code and being responsive to a particular code, which, when present, causes the pseudo random sequence generator of the receiver to start in particular relation to the production of the same pseudo random sequence in the transmitter, the code having essentially zero cross correlation with any of the pseudo random sequences.

12. In a system as described, a transmitter comprising:

first means for providing a spread spectrum information modulated carrier signal with pseudo random subcarrier;

second means for providing a particular reproduceable pseudo random pulse sequence of long duration selected from a plurality of pseudo random pulse sequences having essentially zero cross correlation and having an auto correlation resembling the auto correlation of true random pulse sequence; and third means connected to the first and second means for transmitting the modulated carrier signal in response to occurrence of the pulses of the sequence.

13. In a system as set forth in claim 12, a receiver for receiving the transmitted carrier signal and having fourth means for providing said pulse sequence, and means responsive to the pulse sequence as provided by the fourth means for controlling selective suppression of carrier signals as received during absence of pulses of the sequence.

14. In a system as set forth in claim 13, the transmitter including addressing code producing means, for transmitting the addressing code ahead of the information modulated carrier, the receiver including means responsive to the addressing code when received for starting the fourth means.

15. In a system as described, a transmitter comprising:

first means including a source for a carrier signal, a source for a pseudo random subcarrier, and a source for an information signal for providing a spread spectrum, information modulated carrier signal;

second means for providing a signal train having a particular recurring characteristic which recurs at random but is reproduceable, the resulting pseudo random recurrence of the characteristic being selected from a plurality of reproduceable random recurrences with essentially zero cross correlation, the auto correlation functions of the pseudo random subcarrier and of the pseudo randomly recurring characteristics of the signal train resembling the auto correlation of a true random signal sequence; and third means connected to the first means for transmitting the carrier signal and including means connected to the second means to be responsive to the signal trains for modulating the transmission in accordance with said characteristics as recurring in said signal train.

16. A transmitter as set forth in claim 15, the first means including fourth means providing a second signal train as the pseudo random subcarrier and having a particular, reproduceable at random recurring characteristics, selected from a plurality of reproduceable random recurrences with essentially zero cross correlation and auto correlation function resembling the auto correlation of a true random signal sequence; and fifth means responsive to an information signal to provide modulation to the carrier in response to the information signal and the second signal train.

17. A transmitter as set forth in claim 16, the fifth means comprising:

a first modulator connected to the fourth means for modulating the second signal train with information signal to produce a third signal train, and a second modulator responsive to the third signal train to modulate the carrier with the third signal train.

18. A transmitter as set forth in claim 16, the fifth means comprising a first modulator for modulating the carrier with the information signal, and a second modulator connected to receive the information modulated carrier as provided by the first modulator to modulate the information modulated carrier with the second signal train.

19. A transmission system which includes:

a plurality of transmitters and receivers, each transmitter adapted to provide and transmit a spread spectrum signal which includes an intelligence band and a pseudo random sequence band, each receiver including means to separate from the spread spectrum signal received a particular pseudo random sequence band for recovering the intelligence band, the improvement comprising:

gating means in each of said transmitters and said receivers, respectively governing the passage of spread spectrum signals therein, respectively prior to transmission and subsequent to reception;

a plurality of pseudo random sequence generators, one in each of said receivers, each generator producing a different code sequence, whereby the auto correlation and the cross correlation between any two code sequences resemble the respective correlations of true random sequences, the generator in any receiver respectively connected controlling the gating means in such receiver;

means in each of said transmitters for producing code sequences of the plurality and connected to provide the code sequence as gating signals for the gating means in such transmitter; and means in each of the receivers responsive to the beginning of production of the code sequences in the transmitter to start the generator in a particular one of the receivers, the phase between the production of the same code sequence in the transmitter and receiver corresponding to the transmission time between the transmitter and the receiver the generator of which having been started.

References Cited

UNITED STATES PATENTS 3,292,178 12/1966 Magnusk.
3,204,035 8/1965 Ballard et al.

(Other references on following page)

UNITED STATES PATENTS

| | | |
|---|---|---|
| 3,160,711 | 12/1964 | Schroeder. |
| 2,719,188 | 9/1955 | Pierce. |
| 3,380,023 | 4/1968 | Magnuski. |

OTHER REFERENCES

Digital Communications with Space Applications Textbook, Prentice-Hall, 1964.

See Chapter 1, "Introduction to Digital Communications," pp. 1–16.

RALPH D. BLAKESLEE, Primary Examiner

U.S. Cl. X.R.

325—54, 55